United States Patent
Davies

(10) Patent No.: US 12,196,244 B2
(45) Date of Patent: Jan. 14, 2025

(54) NUTLESS BOLT

(71) Applicant: Metso Outotec Finland Oy, Tampere (FI)

(72) Inventor: Brian Davies, Western Australia (AU)

(73) Assignee: Metso Outotec Finland Oy, Tampere (FI)

( * ) Notice: Subject to any disclaimer, the term of this patent is extended or adjusted under 35 U.S.C. 154(b) by 373 days.

(21) Appl. No.: 17/664,003

(22) Filed: May 18, 2022

(65) Prior Publication Data

US 2022/0275822 A1 Sep. 1, 2022

Related U.S. Application Data

(63) Continuation of application No. PCT/AU2020/051263, filed on Nov. 20, 2020.

(30) Foreign Application Priority Data

Nov. 20, 2019 (AU) .................................. 2019904390

(51) Int. Cl.
*F16B 35/04* (2006.01)
(52) U.S. Cl.
CPC .................................. *F16B 35/041* (2013.01)
(58) Field of Classification Search
CPC ........ F16B 13/04; F16B 13/06; F16B 13/063; F16B 13/10; F16B 13/12; F16B 13/126;

(Continued)

(56) References Cited

U.S. PATENT DOCUMENTS 1,923,025 A 8/1933 Morset et al.
2,901,804 A * 9/1959 Williams .............. F16B 21/165
74/41

(Continued)

FOREIGN PATENT DOCUMENTS

DE 2625023 A1 * 12/1976
EP 0748943 A1 12/1996

(Continued)

*Primary Examiner* — Jonathan P Masinick
(74) *Attorney, Agent, or Firm* — Levine Bagade Han LLP

(57) ABSTRACT

A nutless bolt 10 for fastening a wear plate 12 to a structure 14 comprises a body 16 having a shaft 18 and a stop 20 coupled to the shaft 18. Shaft 18 is dimensioned to pass through a hole 22 in structure 14 while stop 20 is configured to stop the body 16 from falling wholly into or through the hole 22, and to engage with the wear surface plate. An axial bore 24 is formed in body 16 and houses locking balls 58 and a rod 28. The body 16 also has radial channels along which the balls 58 can roll. The rod 28 has a tapered portion 70 which increases in outer diameter from a first location L1 to a second location L2. In use the balls 58 are initially at the first location L1 on the rod 28 and partially within respective channels 56. Pulling the rod 28 in an up-hole direction results in the rod 58 moving in a radial outward direction as they roll along the tapered portion 70 to the location L2. The balls now lie partially outside of the of the body 16 locking the bolt 10 in the hole 22. Applying additional pulling force on the rod increases tension in the rod to intentionally cause a controlled break or separation of the rod into a first portion 72 that is withdrawn from the bore and a second portion 62 that remains in the bore and bearing against the balls 58.

19 Claims, 1 Drawing Sheet

(58) Field of Classification Search
CPC .... F16B 13/128; F16B 5/0084; F16B 5/0088; F16B 5/0642; F16B 21/16; F16B 21/165; F16B 19/10; F16B 19/1027; F16B 19/1036; F16B 19/1045; F16B 19/1054; F16B 35/04; F16B 35/041; F16B 35/042; F16B 35/044; F16B 35/045; F16B 35/048; F16B 35/06

See application file for complete search history.

(56) References Cited

U.S. PATENT DOCUMENTS

| | | | |
|---|---|---|---|
| 3,427,919 A | | 2/1969 | Lerich |
| 4,752,169 A | | 6/1988 | Pratt |
| 4,828,438 A | * | 5/1989 | Shackelford .......... F16B 37/067 411/173 |
| 4,921,381 A | | 5/1990 | Gschwend et al. |
| 5,452,979 A | * | 9/1995 | Cosenza ............. B60R 21/2035 411/348 |
| 8,549,724 B2 | * | 10/2013 | Davies ................ F16B 19/1081 411/21 |
| 8,920,063 B1 | * | 12/2014 | Easley .................. F16B 21/165 403/328 |
| 9,194,410 B2 | * | 11/2015 | Davies ................... F16B 15/04 |
| 9,212,678 B2 | * | 12/2015 | Pratt ................... F16B 19/1054 |
| 9,303,674 B2 | * | 4/2016 | Demmeler ............. F16B 21/18 |
| 11,493,073 B2 | * | 11/2022 | Schlegel .......... H01R 13/62927 |
| 2007/0001408 A1 | | 1/2007 | Soltis et al. |

FOREIGN PATENT DOCUMENTS

| WO | WO-9831942 A2 * | 7/1998 | ........... F16B 21/165 |
|---|---|---|---|
| WO | WO 2006/108245 | 10/2006 | |
| WO | WO 2021/097536 | 5/2021 | |

* cited by examiner

NUTLESS BOLT

CROSS-REFERENCE TO RELATED APPLICATIONS

This application is a continuation of International Patent Application Number PCT/AU2020/051263 filed Nov. 20, 2020, which claims priority to Australian Patent Application Number 2019904390 filed Nov. 20, 2019, both of which are incorporated herein by reference in their entireties for all purposes.

FIELD OF THE INVENTION

The present invention relates to a nutless bolt.

BACKGROUND OF THE INVENTION

Applicant has made many innovations in the area of fasteners, particularly for fastening wear plates to the surface of a structure. An example of one such fastener is described in International publication no. WO 2006/018245. The fastener described in the aforementioned publication may also be considered as a nutless bolt which is inserted into a hole from one side of a surface and is applied or fixed in place by attaching an application tool to a head of the bolt and driving a pin into a bore formed centrally through the head and a shank of the bolt. The shaft is provided with a number of radially extending channels each of which provides a run for a corresponding ball. When the pin is driven in a down hole direction into the shaft it forces the balls to move radially along their respective channels to protrude partially from the channels beyond an outer circumferential surface of the shaft. This prevents the fastener from being removed in a direction opposite to the direction of insertion and in effect locks the fastener in place. To remove the fastener, the pin is pushed further in the down hole direction and falls from the shaft. This enables the balls to roll in a radially inward direction to lie within the outer circumferential surface of the shaft. Thus, the fastener can now be removed from the hole. The ability to remove the fastener from the hole characterises the fastener as a bolt. This is to be contrasted from rivets which can only be removed by destroying the rivet itself.

SUMMARY OF THE INVENTION

An embodiment provides a nutless bolt comprising: a body having a shaft capable of insertion in to a hole and a stop coupled to the body, the stop configured to stop the body falling wholly into or through the hole, the shaft being provided with an axially extending bore; a locking mechanism disposed in the shaft and operable to extend radially from the shaft to lock the body in the hole; and, an actuator being disposed in the shaft and being movable axially in the bore in an up hole direction from an insertion position, where the locking mechanism is retracted in the shaft to allow insertion of the shaft into the hole, to a locking position, where the actuator causes the locking mechanism to extend radially from the shaft to lock the body in the hole, wherein the actuator is arranged to break (e.g. separate) into a first portion and a second portion in a controlled manner upon application of a tensile force subsequent to being moved to the locking position, wherein the second portion is retained in the body maintaining the locking mechanism in the locking position and the first portion able to be withdrawn from the body.

In an embodiment, the shaft has an abutment surface and the actuator is moveable such that the second portion can abut the abutment surface. Movement of the actuator in the up hole direction may apply the tensile force when the second portion abuts the abutment surface. The abutment surface may be provided as a flange extending radially inwards from an inner surface of the bore. The second portion may abut the abutment surface when the actuator is in the locking position. The actuator may comprise a failure mechanism located between or coupling the first portion to the second portion.

In an embodiment, the first and second portions are connected to one another with a threaded connection. The failure mechanism may comprise a threaded connection between the first and second portions. The actuator, such as the first portion, may be provided with an engagement section that can engage with a tool for moving the actuator from the insertion position to the locking position.

In an embodiment, the actuator comprises a first surface portion and a second surface portion. The locking mechanism may engage with the first surface portion when the actuator is in the insertion position and the locking mechanism may engage with the second surface portion when the actuating is in the locking position. The first surface portion may have a first radially extending width and the second surface portion having a second radially extending width. The first radially extending width may be less than the second radially extending width. The actuator may comprise a taper extending from the first location to the second location. The second surface portion may be on the second portion.

In an embodiment, the stop is provided with an outer circumferential surface having opposite first and second axial ends wherein the first axial end is located closest the hole when the fastener is inserted into the hole. The first axial end may have a smaller diameter than the second axial end. The outer circumferential surface of the stop may be generally tapered at a first angle between the first and second axial ends.

The bolt may comprise a second head extending from the body. The body may be provided with a threaded portion adjacent the stop. The bolt may further comprise a second head threadingly engagable with the threaded portion of the body. The second head may be provided with a through hole positioned to align axially with the bore in the shaft. The second head may be provided with an outer circumferential surface which tapers at the first angle. The head may be formed of a harder wearing material than the body.

In an embodiment, the bolt comprises a quantity of grease or like material disposed in the shaft in a region between a down hole end of the shaft and the locking mechanism.

In an embodiment, the shaft comprises a plurality of radially extending channels, each channel opening into the bore and onto an outer circumferential surface of the body and configured to allow a portion of the locking mechanism to protrude beyond the outer surface of the shaft when the actuator is in the locking position. The locking mechanism may comprise a plurality of balls.

In an embodiment, the bolt comprises a sleeve disposed about the body at a location where when the actuator is in the locked position the locking mechanism is retained between the actuator and the sleeve and is disposed partly within and partly outside of the body. The sleeve may have an undeformed state where the sleeve has an outer surface of constant outer diameter and retains the locking mechanism in the body prior to the actuator being moved to the locking position; and an expanded state where the sleeve is expanded radially outwards by the locking mechanism when the actuator is moved to the locking position. The sleeve may be configured such that a portion of the sleeve extends into the hole into which the shaft is inserted, and a portion of the sleeve extends from the hole.

In an embodiment, the shaft comprises a first portion adjacent the stop of a first outer diameter, and a second portion contiguous with the first portion having a stepped reduction in outer diameter relative to the first portion. The shaft and the sleeve may be relatively configured so that when the sleeve is provided over the second portion of the shaft, an outer diameter of the sleeve adjacent the first portion of the shaft is essentially equal to the outer diameter of the first portion of the shaft. The sleeve may be attached to the shaft by an adhesive.

From an alternate perspective an embodiment of the nutless bolt may be considered as comprising: a body having a shaft and a stop coupled to the shaft, the shaft has: an upper portion that has a maximum diameter smaller than a smallest diameter of the stop; and a bore that extends axially through the shaft; a plurality of locking elements disposed in the shaft; and, a rod disposed in the shaft, the rod having a first location and a second location downhole of the first location with a plurality of recesses one for each locking element at the first location, and a ramped surface extending from each recess toward the second location where a width of the rod extending in a radial direction at the first location is less than a width of the rod extending in a radial direction at the second location. The locking elements may be in the form of balls.

In this embodiment the shaft has a plurality of channels extending in a radial direction to open at one end onto the bore and opens at an opposite end onto an outer surface of the upper portion, and wherein each locking element is located at least partially in a respective channel.

In this embodiment rod is movable between an insertion position where the recesses are radially aligned with the channels and a locking position where the second location is radially aligned with the channels and the locking elements extend partially from the outer surface of the upper portion of the shaft.

In this embodiment the shaft has a radially extending flange that extends inwardly from an inner surface of the bore In this embodiment the rod has a first portion that includes the first location and a second portion that includes the second location wherein the rod is arranged to break between the first portion and the second portion in a controlled manner upon application of a tensile force, wherein the second portion is retained in the body in a locking position where the locking elements are in contact with the second portion and extend radially past the outer surface of the upper portion of the shaft, and the first portion is able to be withdrawn from the body.

In this embodiment the shaft has an abutment surface configured to abut the second portion of the rod when the rod is moved to the locking position and the tensile force is applied.

The actuator may comprises a failure mechanism located between or coupling the first portion to the second portion. The failure mechanism comprises a threaded connection between the first and second portions.

The rod is provided with an engagement section that can engage with a tool for moving the rod from the insertion position to the locking position.

The stop may be provided with an outer circumferential surface having opposite first and second axial ends wherein the first axial end is located closest the hole when the fastener is inserted into the hole, and wherein the first axial end has a smaller diameter than the second axial end.

In this embodiment the nutless bolt comprises a sleeve disposed about the body on the upper portion at a sleeve seating location where the sleeve covers the channels. The upper part may comprise a first part of constant diameter nearest the stop and a contiguous second part of constant outer diameter which is less than the outer diameter of the first part, wherein a right angle step or shoulder is formed between the first part and the second part. The channels open onto an outer surface of the second part.

Similar to the first embodiment the sleeve has an undeformed state where the sleeve has an outer surface of constant outer diameter and retains the locking elements in the body prior to the actuator being moved to the locking position; and a deformed state where the sleeve is expanded radially outwards by the locking elements when the actuator is moved to the locking position. Also, the sleeve may be configured such that a portion of the sleeve extends into a hole into which the shaft is inserted, and another portion of the sleeve extends from the hole.

BRIEF DESCRIPTION OF THE DRAWINGS

Embodiments of the nutless bolt will now be described by way of example only with reference to the accompanying non-limiting Figures.

DETAILED DESCRIPTION

Figures 1, 2, 3:
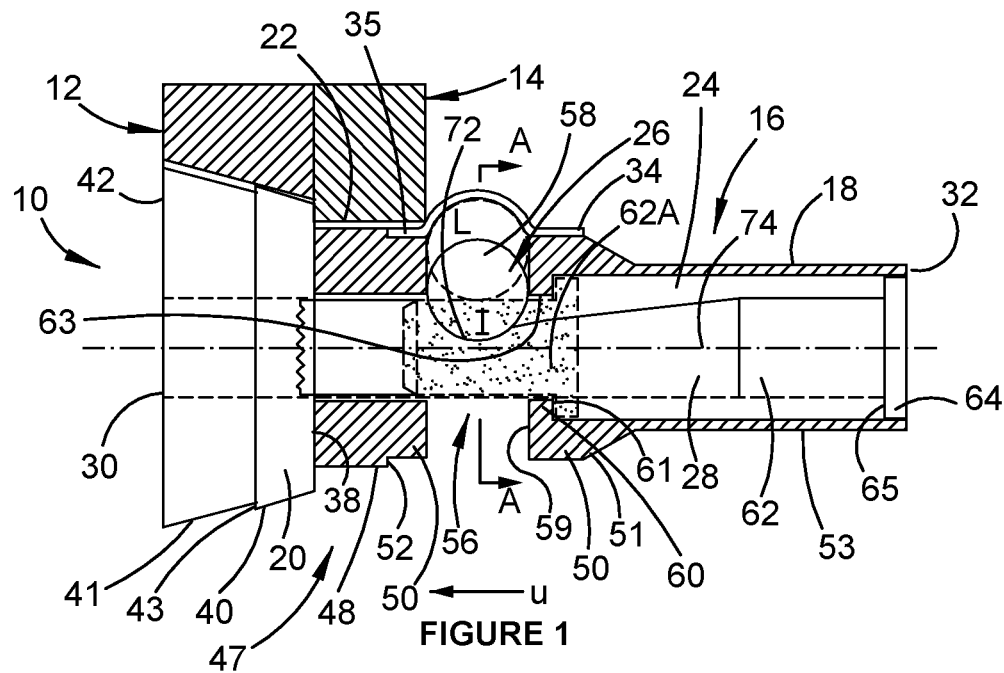
FIG. 1 is a partial cross-section schematic representation of an embodiment of a nutless bolt.
FIG. 2 is a partial cross-section schematic representation of an embodiment of an actuator used in the nutless bolt depicted in FIG. 1.
FIG. 3 is a view of section AA of bolt shown in FIG. 1.

Embodiments of the nutless bolt will now be described by way of example only with reference to the accompanying non-limiting Figures.

FIG. 1 is a partial cross-section schematic representation of an embodiment of a nutless bolt.

FIG. 2 is a partial cross-section schematic representation of an embodiment of an actuator used in the nutless bolt depicted in FIG. 1.

FIG. 3 is a view of section AA of bolt shown in FIG. 1.

FIGS. 1 to 3 illustrate an embodiment of a nutless bolt 10 in accordance with the present invention for fastening a wear plate 12 to a structure 14. Nutless bolt 10 comprises a body 16 having a shaft 18 and a stop 20 coupled to the shaft 18. Shaft 18 is dimensioned to allow it to pass through a hole 22 formed in structure 14 while stop 20 is configured to stop or prevent body 16 from falling wholly into or through the hole 22. The stop 20 is configured to be positioned adjacent or to engage with a wear surface 12. An axial bore 24 is formed in body 16 and houses a locking mechanism 26 which is operable to extend radially from shaft 18 to lock the body 16 and thus the nutless bolt 10 in the hole 22. An actuator in the form of rod 28 is positioned in bore 24. Rod 28 is movable along the bore 24 in either a downhole hole direction or an up-hole direction depending on its operational state. In the context of this specification the expression "down hole direction" corresponds with the direction of insertion of bolt 10 into the hole 22, and the "up hole direction" is in the opposite direction to the down hole direction. Thus, with reference to FIG. 1, the up hole direction indicated by the arrow U is toward the left hand side of the page i.e. in a direction extending from a downhole end 32 towards an up hole end 30 of the nutless bolt 10.

The stop 20 may act as a head of the bolt. The stop 20 may have a hardness greater than the rest of the body. The stop 20 has a first radial surface 38 (being a surface lying in a radial plane with reference to an axis of the bolt) and second radial surface 43 positioned up hole of the surface 38. An outer circumferential surface 40 extends between the surfaces 38 and 43. The surface 40 is frusto-conical in configuration, being tapered in a manner where it's outer diameter progressively increases from a minimum adjacent the surface 38 to a maximum adjacent the surface 43. The stop 20 also has a third radial surface 42 positioned up hole of the second radial surface 43. The third radial surface 42 defines the up hole end 30. A second circumferential surface 41 extends from surface 43 to 42. The surface 41 is also frusto-conical in configuration, being tapered in a manner where it's outer diameter progressively increases from a minimum adjacent the surface 43 to a maximum adjacent the surface 30. The minimum diameter of the surface 41 is less than maximum diameter of the surface 40. Because of this the surface 43 forms and acts as a circumferential shoulder between the circumferential surfaces 40 and 41. Looked at another way, it may be said that the surface 43 extends radially inwards from circumferential surface 40.

As a consequence of the above configuration, the surface 40 slopes or tapers at a first angle relative to a longitudinal axis of bore 24, while the surface 41 slopes or tapers at a second angle relative to a longitudinal axis of bore 24. The second angle may be the same as the first angle. In an embodiment a circumferential groove is formed in surface 40 inboard of surfaces 38 and 43. A resilient O-ring can be seated in the groove. In one embodiment the O-ring may be made from polyurethane.

Downhole of surface 38, the shaft 18 is provided with an upper portion 47 that has a maximum diameter smaller than the smallest diameter of the stop 20. The upper portion 47 includes a first part of constant outer diameter 48 nearest the stop 20 and a contiguous second part 50 also of constant outer diameter which is less than the outer diameter of first part 48. The change in diameter between parts 48 and 50 forms a right angle step or shoulder 52 circumferentially about the shaft 18. Down hole of and contiguous with portion 50 is a portion 51 having a progressively reducing outer diameter in the downhole direction. Down hole of and contiguous with portion 51 is a portion 53 of constant outer diameter which terminates at down hole end 32.

A plurality of radially extending channels 56, shown most clearly in FIGS. 2 and 3 is formed in the upper part 47. More specifically the channels 56 are formed in the portion 50 of shank 18. The channels 56 are evenly spaced about the bore 24 and lie on a common plane. Each channel 56 extends or opens into the bore 24 at one end, and onto an outer surface of shank 18 at an opposite end. In this particular embodiment, channels 56 have a constant inner diameter for the entirety of their length.

The shaft 18 has a radially extending flange 60 that extends inwardly from an inner surface of the bore 24 towards the axis of the bore 24. A down hole side 61 of the flange 60 forms an abutment surface. An up-hole side 59 of the flange 60 is contiguous with a downhole side of each channel 56. A diameter of the bore 24 in the region circumscribed by an inner circumferential surface 63 of the flange 60 is less than a maximum inner diameter of the hole 24. For example the inner diameter at the surface 63 may be about 65%-75% less than the maximum inner diameter of the hole 24, for example as at the down hole end 32.

The locking mechanism 26 is in the form of a plurality of elements 58. In this but not all embodiments the locking elements are in the form of balls 58. (For example, the locking elements may be in the form of short bars or pins having convexly curved opposite ends.) In FIG. 1 only one channel is shown as having a ball 58 for clarity purposes, but in practice each channel 56 is provided with a respective ball 58.

The actuator (i.e. rod) 28 is designed or otherwise arranged to fail e.g. break or separate in a controlled manner when using the nutless bolt 10. The failure occurs upon the actuator operating the locking mechanism 26 and results in parts or segments of the actuator being broken away or separated from each other. One portion or segment remains in the bolt 10 holding the locking mechanism 28 in a locking position. The other portion or segment is removed and discarded from bolt 10.

The actuator, being in the form of the rod 28 has a first portion 74 and a second portion 62, as seen in FIG. 2. The first portion 74 is up hole of the second portion 62. The rod 28 has a recess 72 provided at a first surface portion of the first portion 74 at location L1. A second surface portion of the rod 28 is provided at second location L2 which is along the second portion 62 and is downhole of the first location L1. The recess 72 has a radius that is complementary to a radius of the balls 58 to allow a ball 58 to be partially seated in the recess 72. However, a complementary recess is not required in all embodiments. A width of the rod 28 extending in a radial direction at the first location L1 is less than a width of the rod 28 extending in a radial direction at the second location L2.

In the embodiment shown in FIG. 2, the second location L2 is coincident with and wholly located on the second portion 62. However, in some embodiments a part of the second location L2 can extend onto the first portion 74. A tapered or ramped surface 70 extends between the first and second locations L1 and L2 at an angle relative to the longitudinal axis of the rod 28. In an embodiment, the ramped surface extends at an angle of about 5° to about 10°, such as about 6°, relative the longitudinal axis.

The rod 28 depicted in the Figures is shown as only having one recess 72 and one tapered or ramped surface 70. However, such a depiction is for clarity only and in practice the number of recesses 72 and tapered or ramped surfaces 70 corresponds to the number of balls 58 or channels 56 and will be circumferentially arranged around the rod 28 in a manner to register with the channels 56.

Prior to use of bolt 10, the rod 28 is positioned in the bore 24 so that the balls 58 are seated/recessed in respective recesses 72, which allows the balls 58 to lie partly within a respective channel 56 and partly within the bore 24. In this configuration, the balls 58 do not extend beyond the outer surface of shaft 18 and a gap or space is formed between the balls coaxial with the bore 24. Accordingly, when the rod 28 is in this configuration, the rod 28 is in an "insertion position", that allows the balls to adopt an insertion position I, thereby allowing insertion of the shaft 18 into the hole 22.

The second portion 62 is arranged to break away, separate or shear from the first portion 74. The first portion 74 and second portion 62 are connected to one another with or by a failure mechanism that is designed to preferentially fail under tension. In one embodiment the failure mechanism is a fastener such as threaded connection 68. The fastener has a lower tensile strength than the portions 74 and 62 either due to its smaller diameter or by material choice. Alternately the failure mechanism may be the thread coupling the first and second portions together which can be designed to strip upon application of a tensile force, facilitating the separation of the portions 74, 62 from each other. In another example the failure mechanism may be provided as an adhesive that adheres the first and second portions 74 and 62 together. In such an example the adhesive bond is sufficiently weak to ensure that it fails upon application of a tensile force before tensile failure of the either of the respective portions 74 and 62. In yet another example the failure mechanism may be an interference fit between two portions 74, 62, where the interference fit is configured to allow the two portions to separate from one another upon application of the tensile force.

In one embodiment the first portion 74 and second portion 62 are integral with one another as a single piece structure but with a fatigue line or stress concentrator (for example a V shaped notch or score line) delineating the first and second portions 74 and 62 to allow the second portion 62 to shear off from the first portion 74 at the fatigue line. This is, the fatigue line acts as the failure mechanism. In an embodiment, the failure mechanism is provided as an adhesive that adheres the first and second portions 74 and 62 together.

In the embodiment shown in FIG. 2, the threaded connection that acts as the failure mechanism is a bolt 71 extending from the second portion 62, with the bolt engaging with a complementary threaded bore 69 located in the first portion 74. In an embodiment the first portion 74 is provided with the bolt and the second portion 62 has the complementary threaded bore. In an embodiment both the first portion 74 and second portion 62 are provided with a threaded bore, and a bolt engages with both threaded bores to connect the first portion 74 to the second portion 62.

The second portion 62 has a chamfered up hole end 78. A radially outward extending flange 64 is provided at a down hole end of the second portion 62. The flange 64 has an up hole surface 65. The first portion 74 is provided with an engagement section in the form of thread 76. The thread 76 engages with a tool to allow movement of the rod 28 in the bore to lock the bolt 10 in the hole.

When the bolt 10 is inserted in the hole 10, the rod 28 is in the insertion position where the balls 58 are seated in the recess 72. Movement of the rod 28 in an up hole direction, for example with a tool engaged with thread 76, causes the balls 58 to become unseated from the recess 72 with the rod 28 forcing the balls 58 radially outwards so that they protrude from the channels 56 past surface 50. Once the rod 28 has been sufficiently moved in the up hole direction the balls 58 reside at the second location L2 on the second portion 62 where the balls 58 are in a locking position L.

Further movement of the rod 28 in the up hole direction causes surface 65 to abut surface 61. Once surface 65 abuts surface 61, any further force applied to the rod 28 in an up hole direction is transferred to the threaded connection 68. When the force transferred to the threaded connection 68 (i.e. the failure mechanism) exceeds the tensile limit of the threaded connection 68 (i.e. a force that causes the threaded connection 68 to break, shatter or fragment into two, or to strip the thread), the second portion 62 is broken off, or otherwise separated, from the first portion 74 to form sheared second portion 62A. Once the second portion 62 is broken off or separated from the first portion 74, the first portion 74 can be withdrawn from the bore 24, and the sheared second portion 60A resides in the bore 24 allowing the balls 58 to be maintained in the locking position L. After the first portion 74 has been removed from the bore 24, a plug of material can be filled into an up hole side of the bore 24 relative the sheared second portion 62 to prevent unintended movement of the sheared second portion 62 in a down hole direction. The plug may be formed form a settable compound such as grout or an epoxy resin.

Prior to placing the rod 28 within the body 16 (which is form the downhole end 32 with the thread 76 first), a volume of grease or similar viscous hydrophobic lubricant material is deposited in the bore 24 typically up to the level of the channels 56. As the rod 28 is moved from the insertion position to the locking position, this grease or other material is forced to flow back up the bore 24 through the clearance between rod 28 and the inner surface of bore 24, as well as along and through the channels 56. The flow of the grease or similar material has several benefits including minimising rust and corrosion of fastener 10, assisting in maintaining balls 58 and rod 28 within body 16, and lubricating the nutless bolt 10 to facilitate easy removal.

The bolt 10 is provided with a sleeve 34 which surrounds body 16 and in particular second part 50. The sleeve 34 is fitted to the body 16 prior to insertion of the bolt 10 into the hole 22. Sleeve 34 is fitted onto the upper portion 47 at location where it covers the channels 56. The sleeve 34 is made of a deformable material including but not limited to ductile metals or metal alloys such as aluminium and brass. Sleeve 34 can be interference fit onto the upper portion 47 or alternately may be provided with a looser fit but attached to the body 16 by an adhesive. More specifically the sleeve 34 is fitted onto the second part 50 which is a part of the upper portion 47.

When initially fitted to the body 16, the sleeve 34 is in the form of a short cylindrical tube having a constant inner diameter and a larger and constant outer diameter. This may be taken as the "undeformed" or "initial" condition of the sleeve 34, which is not shown in the accompanying Figures. As explained more fully below, the sleeve 34 is disposed about the body 16/shaft 18 at a sleeve seating location where, when the actuator/rod 28 is in the locked position the locking mechanism/balls 58 are retained between the actuator and the sleeve 34 and are disposed partly within and partly outside of the body 16/shaft 18.

The sleeve 34 has an axial length so that when against the shoulder 52 the sleeve 34 overlies the channels 56. In one embodiment the length of the sleeve 34 may be equal to the axial length of the second part 50. The sleeve 34 has an outer diameter substantially the same as the outer diameter of the first 48. Also, the sleeve 34 may be formed of a thickness substantially the same as the depth of the shoulder 52, so that when seated against the shoulder 52, an inner circumferential surface of the sleeve 34 contacts or is in close proximity to the outer circumferential surface of the second part 50. Body 16 is configured so that when sleeve 34 is seated against shoulder 52, and the bolt 10 is inserted into hole 22, an up hole portion 35 of sleeve 34 resides in the hole 22.

Sleeve 34 acts to maintain balls 58 partially within their respective channels 56 when second portion 62 is in the locking position 62A. More specifically when pulling the rod 28 in the up hole direction, the sleeve 34 is deformed by the resultant movement of the balls in a radial outward direction along the channels 56 to the locking position L where the balls are partially located outside of the shaft 18. Thus when in the locking position the balls extend past the outer surface of the upper portion 47, and more particularly the outer surface of the second part 50. This deforms the sleeve 34 at least in the region of the balls 58 to protrude radially beyond the hole 22 and thus underlie the structure 14 as shown in FIG. 1. The bolt 10 is now locked in the hole 22 fastening the wear plate 12 to the structure 14.

To remove the bolt 10 from the hole 22, which were example will be required in order to replace the wear plate 12, the sheared second portion 62A is moved in a down hole direction. This can be done using one or more tool such as a hammer/mallet and to a punch, until it is clear from the channels 56. Once the sheared second portion is clear of the channels 56, the balls 58 can move radially inwards back into the insertion position I, i.e. to lie partly within the respective channel 56 and partly within the bore 24. By now pulling upwardly on the head/stop 20, the deformed sleeve 34 slides of the shaft 18 allowing removal of the bolt 10 from the hole 22.

All such modifications and variations together with others that will be obvious to persons of ordinary skilled in the art are deemed to be within the scope of the present invention the nature of which is to be determined from to the above description and the appended claims.

It is to be understood that, if any prior art publication is referred to herein, such reference does not constitute an admission that the publication forms a part of the common general knowledge in the art, in Australia or any other country.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

What is claimed is:

1. A nutless bolt comprising:
    a body having a shaft capable of insertion in to a hole and a stop coupled to the body, the stop configured to stop the body falling wholly into or through the hole, the shaft being provided with an axially extending bore;
    a locking mechanism disposed in the shaft and operable to extend radially from the shaft to lock the body in the hole; and,
    an actuator mechanism being disposed in the shaft and being movable axially in the bore in an up hole direction from an insertion position, where the locking mechanism is retracted in the shaft to allow insertion of the shaft into the hole, to a locking position, where the actuator causes the locking mechanism to extend radially from the shaft to lock the body in the hole,
    wherein the actuator is arranged to break into a first portion and a second portion in a controlled manner upon application of a tensile force subsequent to being moved to the locking position, wherein the second portion is retained in the body maintaining the locking mechanism in the locking position and the first portion able to be withdrawn from the body.

2. The nutless bolt according to claim 1 wherein the shaft has an abutment surface configured to abut the second portion of the actuator when the actuator is moved to the locking position.

3. The nutless bolt according to claim 2 wherein the abutment surface is provided as a flange that extends radially inwards from an inner circumferential surface of the bore.

4. The nutless bolt according to claim 1 wherein the actuator comprises a failure mechanism located between or coupling the first portion to the second portion.

5. The nutless bolt according to claim 4 wherein the failure mechanism comprises a threaded connection between the first and second portions.

6. The nutless bolt according to claim 1, wherein the actuator is provided with an engagement section that can engage with a tool for moving the actuator from the insertion position to the locking position.

7. The nutless bolt according to claim 1, wherein the actuator comprises a first surface portion and a second surface portion, wherein the locking mechanism engages with the first surface portion when the actuator is in the insertion position and the locking mechanism engages with the second surface portion when the actuating is in the locking position.

8. The nutless bolt according to claim 7, wherein the first surface portion has a first outer diameter and the second surface portion has a second outer diameter which is greater than the first diameter, and the actuator comprising a tapered surface extending from the first location to the second location.

9. The nutless bolt according to claim 7, wherein the second surface portion is on the second portion.

10. The nutless bolt according to claim 1, wherein the stop is provided with an outer circumferential surface having opposite first and second axial ends wherein the first axial end is located closest the hole when the fastener is inserted into the hole, and wherein the first axial end has a smaller diameter than the second axial end.

11. The nutless bolt according to claim 10, wherein the outer circumferential surface of the stop is generally tapered at a first angle between the first and second axial ends.

12. The nutless bolt according to claim 1, comprising a quantity of grease or like material disposed in the shaft in a region between a down hole end of the shaft and the locking mechanism.

13. The nutless bolt according to claim 1, wherein the shaft comprises a plurality of radially extending channels, each channel opening into the bore and onto an outer circumferential surface of the body and configured to allow a portion of the locking mechanism to protrude beyond the outer surface of the shaft when the actuator is in the locking position.

14. The nutless bolt according to claim 1, wherein the locking mechanism comprises a plurality of balls.

15. The nutless bolt according to claim 1, comprising a sleeve disposed about the body at a sleeve seating location where when the actuator is in the locked position the locking mechanism is retained between the actuator and the sleeve and is disposed partly within and partly outside of the body.

16. The nutless bolt according to claim 15, wherein the sleeve has an undeformed state where the sleeve has an outer surface of constant outer diameter and retains the locking mechanism in the body prior to the actuator being moved to the locking position; and a deformed state where the sleeve is expanded radially outwards by the locking mechanism when the actuator is moved to the locking position.

17. The nutless bolt according to claim 15, wherein the sleeve is configured such that a portion of the sleeve extends into the hole into which the shaft is inserted, and another portion of the sleeve extends from the hole.

18. The nutless bolt according to claim 15, wherein the shaft comprises a first portion adjacent the stop of a first outer diameter, and a contiguous second portion having a stepped reduction in outer diameter relative to the first portion, the second portion of the shaft being at the sleeve seating location, and wherein the sleeve has an outer diameter substantially equal to the first outer diameter.

19. The nutless bolt according to claim 15, wherein the sleeve is attached to the shaft by an adhesive.

* * * * *